May 15, 1951   W. E. URSCHEL   2,553,020
UNIVERSAL JOINT
Filed March 25, 1946
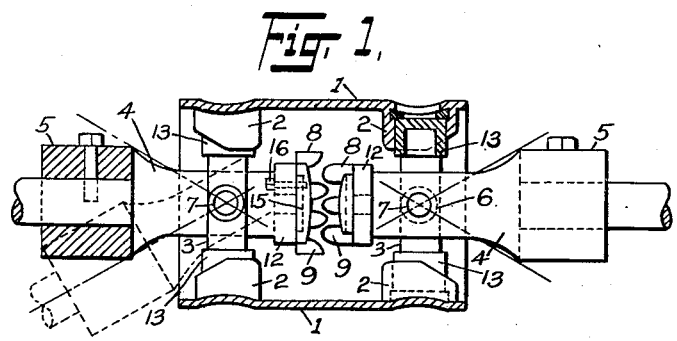
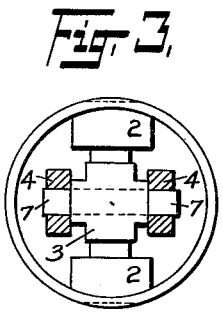
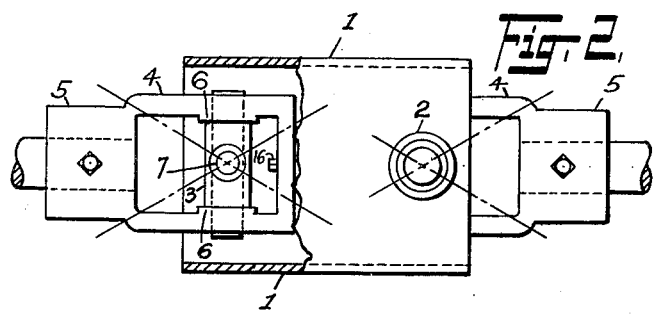
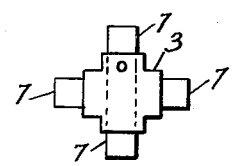
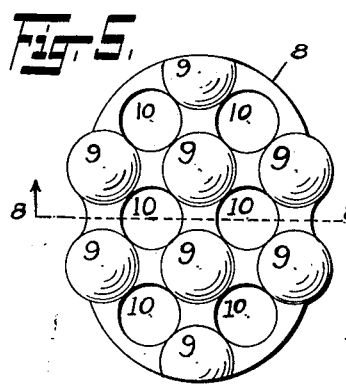
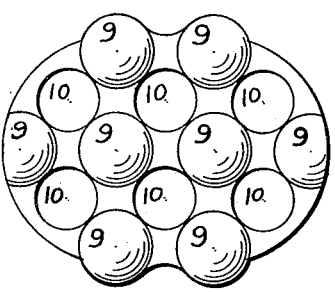
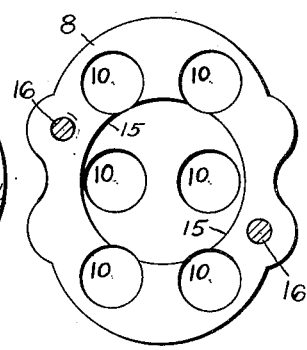
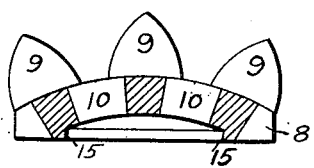
William E. Urschel INVENTOR
BY T.S. Armstutz
ATTORNEY Patented May 15, 1951

2,553,020

UNITED STATES PATENT OFFICE 2,553,020

UNIVERSAL JOINT

William E. Urschel, Valparaiso, Ind.; Joe R. Urschel administrator of said William E. Urschel, deceased Application March 25, 1946, Serial No. 656,955

1 Claim. (Cl. 64—21)

My invention relates to improvements in universal joints and it more especially includes the structure described in the specification and pointed out in the annexed claim.

The purpose of my invention is to provide a universal joint that is especially adaptable for use in tractor equipped farm machinery for harvesting and similar purposes; that provides a change in alignment between the driving and the driven shafts of approximately 30° on each side of the center line of the two shafts when in alignment with each other; that permits a range of 60° included angle throughout a circumference of 360°; that utilizes cross-members with trunnion portions positioned 90° from each other; it provides duplicate yoke members that are pivoted, each to its respective cross; that provides removable interacting teeth secured to the inner end of each yoke; and that includes an enclosing tubular member in which the crosses are held in a spaced-apart relation. The tubular member acts as a limit to the angular movement of each yoke and at the same time protects the joint against the accidental admission of extraneous material that would interfere with the interacting teeth. The teeth are also protected by the tube to prevent anyone accidentally getting the fingers of the hand injured by the teeth.

With these and related ends in view I illustrate in the accompanying drawing such an instance of adaptation as will disclose the broad features of the invention without limiting myself to the specific details shown thereon and described herein.

Fig. 1 is an elevation partly in section, on a vertical plane.

Fig. 2 is a top plan view of Fig. 1, partly in section.

Fig. 3 is an end view of Fig. 1, also partly in section.

Fig. 4 is an elevation of one of the crosses.

Fig. 5 is a face elevation of one of the interacting gears.

Fig. 6 is a face view of the companion interacting gear displaced from that in Fig. 5.

Fig. 7 is an elevation of the rear face Fig. 5.

Fig. 8 is a section on line 8—8 of Fig. 5.

In practicing my invention I may use whatever modifications that the exigencies of varying conditions may demand without departing from the broad spirit of the invention.

The complete joint assembly includes two duplicate members hinged in a tubular housing 1. They are kept in alignment by a pair of interacting gears 8. The yokes 4 are mounted on crosses 3 which are hinged in the housing 1. Bushings 13 are retained in the tubular housing by snap rings 14, and the bushings 13 provide suitable bearings 2 for the crosses.

To maintain the two duplicate yokes 4 in correct alignment gears 8 are mounted on the closed ends 12 of the yokes by means of cap screws 16. Each of the gears 8 have projecting teeth 9 which mesh in corresponding holes 10 in the mating gear. These teeth 9 and corresponding holes 10 approximate an elliptical shape to give an interaction similar to standard involute gears. No rotary power is transmitted by the gears. Their entire purpose is to maintain the yokes in alignment.

A conventional type of single universal joint does not give sufficient angular movement to provide satisfactory performance when used in driving various crop harvesting machines by the power take-off shaft of a tractor when it is necessary to make sharp or short radius turns with the associated equipment, in order to cover the largest acreage with the least amount of travel.

As the angularity of a single joint increases, the shafts to which the joints are connected are driven at an increasingly variable speed. The actual speed variation from that when the yokes are in axial alignment is 28.87 per cent when the shafts are 30° out of axial alignment. This variation in angular speed causes excessive vibration in all the interconnecting machinery. This change in velocity may be reduced by increasing the number of joints in tandem, but to do this each shaft must be provided with a bearing to hold the joints in the proper relation. It is impracticable to do this because the joints must connect the mechanism of a harvesting machine to the power take-off of a tractor which has both lateral and vertical movement independent the machine that is being drawn.

In my new joint both of these difficulties are overcome. In effect it is a self-supporting twin universal joint which will transmit motion at a uniform speed and which will operate at a greater angle than is common. As stated, it will simplify the tandem connection of the operating mechanism of a harvester to the power take-off of a tractor, because no supporting bearings are necessary.

I provide yoke members 4 in duplicate of each other. These members have shaft extensions 5 and closed ends 12, also bearings 6. The closed ends 12 have a concentric boss, on which the concentric recesses 15 of the gears 8 are seated. Each yoke 4 is provided with a cross member 3 that has trunnions 7.

The removable gears 8 have elliptical projecting teeth 9 that seat in the openings 10 of the companion gear, as the gears are rotated. The trunnions 7 have bearing in bushings 13, that are seated in the bearings 2 of the casing 1.

The casing 1, in tubular form encloses the operating parts of the joint. It has bearings 2 for two trunnions 7 of each cross 3. The closed bushings 13 assist in making the crosses easily insertable and removable from the inside of the casing.

Snap rings 14 serve to hold the capped bearings 13 and the crosses 3 in assembled and operated relation in the bearings 2 of the casing 1. The gears 8 are held in place by cap screws 16.

I do not limit myself to the specific type of gears 8 shown in the drawing. Any other type of gears will cooperate in keeping the two yokes in angular relation to each other whether in axial alignment or otherwise. The gears 8 in Figs. 5 and 6 roll face to face. They are attached to the closed portion 12 of the yokes 4 and by reason of the hinged points 6 of the yokes being at the same radius from their pitch circle they are maintained in continuous engagement regardless of any changes that may be made in the axial alignment of one yoke to the other. These dimensions are rigidly maintained by the tubular casing 1 and the bearings 2 for the crosses 3. If necessary the bosses 2 may be beveled to provide clearances when the yokes are swung into extreme out of axial parallelism. The tubular casing 1 limits the extent to which the yokes may be swung around.

Through the use of the gears at the adjacent ends of the yokes and the transmission of power through the trunnions and the crosses considerable wear will follow on these parts. The gears compensate for this and they prevent wobble and uncertainty in the alignment of the respective shafts. With a ball and socket the conditions are worse because in addition to the wear in the trunnions there is an extra amount of wear in the ball and socket. All this is avoided through the use of the intermeshing gears.

What I claim is:

A universal joint which comprises an enclosing tubular sleeve for supporting separate interacting ends of a pair of shafts, a pair of duplicated crosses pivoted in parallel relation on the inside of the sleeve and each provided with trunnions at right angles to said pivots, a simple shaft, a forked terminal for the shaft, pivoted to the trunnions of one cross, an integral member joining the free ends of the fork to form a support, a removable gear segment on the support said segment provided with semi-conical teeth on its face, a second shaft, a companion forked member pivoted to the trunnion of the other cross said fork also being provided with a closed end to form a support for a companion gear segment provided with semi-conical teeth on its face said teeth displaced at an angle of approximately 90 degrees to the angular alignment of the teeth of the companion gear on the other forked terminal.

WILLIAM E. URSCHEL.

REFERENCES CITED

The following references are of record in the file of this patent:

UNITED STATES PATENTS

| Number | Name | Date |
|---|---|---|
| 1,898,265 | Ragan | Feb. 21, 1933 |
| 1,933,494 | Chilton | Oct. 31, 1933 |
| 2,133,176 | Parent | Oct. 11, 1938 |

FOREIGN PATENTS

| Number | Country | Date |
|---|---|---|
| 377,760 | Great Britain | 1932 |